Aug. 30, 1932. K. HENRICHSEN ET AL 1,874,523
AIRCRAFT COWLING FOR TANDEM MOTORS
Filed July 8, 1930
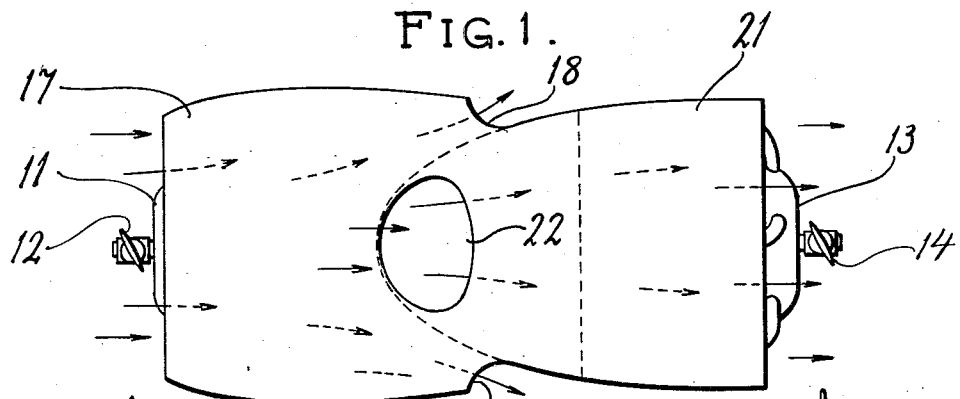
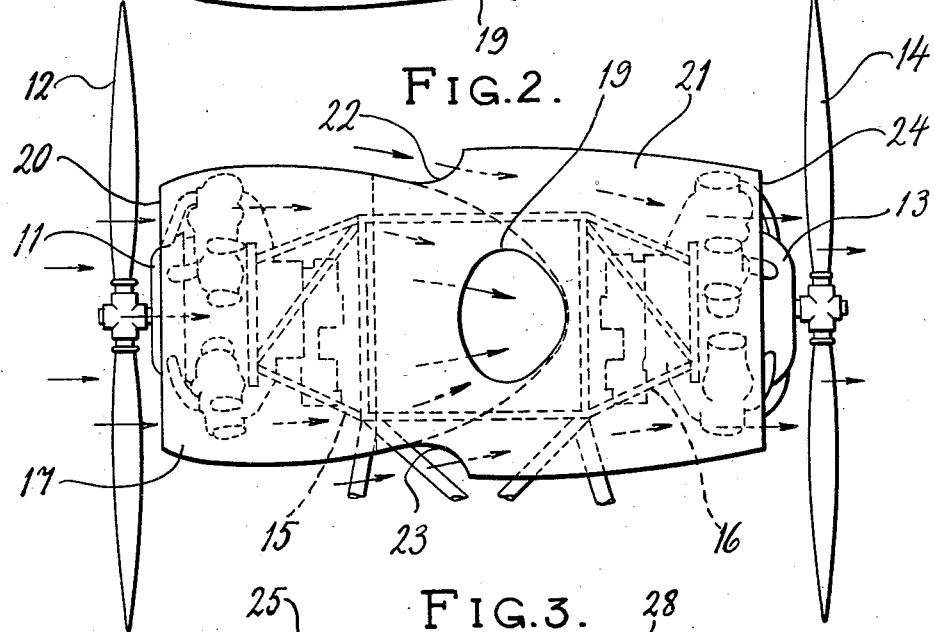
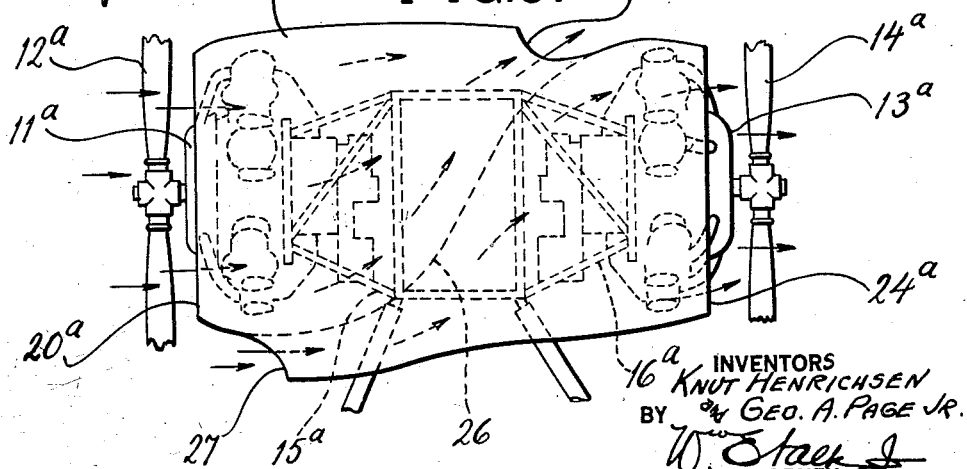
INVENTORS
KNUT HENRICHSEN
GEO. A. PAGE JR.
BY
ATTORNEY Patented Aug. 30, 1932

1,874,523

UNITED STATES PATENT OFFICE

KNUT HENRICHSEN, OF GARDEN CITY, AND GEORGE A. PAGE, JR., OF FREEPORT, NEW YORK, ASSIGNORS TO CURTISS AEROPLANE & MOTOR COMPANY, INC., A CORPORATION OF NEW YORK

AIRCRAFT COWLING FOR TANDEM MOTORS

Application filed July 8, 1930. Serial No. 466,447.

Our invention relates to aeronautical engines and more especially to a method of and means for cooling such motors when they are arranged in tandem by the passage of air around the component parts thereof.

Aeronautical motors are usually either liquid cooled or air cooled. Usually prior to our invention air cooled motors either have been arranged singly or when arranged in plural have been laterally spaced from each other. There have been some attempts to place such motors in tandem and cool them by the passage of air successively first over the forward engine and thereafter over the aft engine, but such attempts have been largely unsuccessful for the reason that it has been almost impossible thus to efficiently cool the aft engine.

One of the objects of our invention is the decrease of wind resistance in aircraft by placing the motors in tandem and by thus cutting down the area projected into the wind stream.

A further object of our invention is the efficient cooling of such tandem air cooled motors.

A further object of our invention is to so arrange the cowling of tandem air cooled motors as to reduce to a minimum the air resistance caused by said motors and cowling.

Further objects will be apparent from a reading of the subjoined specification and claims and from a consideration of the accompanying drawing.

In order to explain the invention more clearly, one embodiment thereof is shown in said drawing, in which:

Fig. 1 is a more or less diagrammatic plan view of engine compartments and enclosed engines all arranged according to our invention;

Fig. 2 is a more or less diagrammatic view in elevation of the compartments and engines shown in Fig. 1; and Fig. 3 is a view similar to Fig. 2 of a modified form of construction also arranged according to our invention.

In general, we so design the engine compartments that one air cooled motor is placed directly behind another. We so arrange the cowling and partitions between the compartments that the air which flows past the forward motor does not contact with the aft motor and that fresh air which has not previously contacted with the forward motor is drawn in to flow past the aft motor. While we have shown the design as constructed with only two motors, yet it is clear that we could, if desired, in a similar manner arrange three or more motors for tandem air cooling.

In Fig. 1 we have shown a forward air cooled motor 11 arranged to operate a propeller 12 and a rear air cooled motor 13 arranged to drive a propeller 14. Suitable motor supports 15 and 16 are secured to the aerial vehicle for supporting the motors 11 and 13.

The motor 11 is enclosed in a casing 17 which when viewed in elevation is very similar in outward contour, to conventional motor casings. When thus viewed, the rear part of this casing 17 appears rounded off in substantially streamline shape so as to minimize wind resistance. However, the depth of the casing is nearly uniform from front to rear, though the surface is slightly curved, so that the casing has a more or less wedge shape. There are formed on each side of and at the rear of this casing substantial openings 18 and 19 through which air, after passing over the motor 11, may escape to the atmosphere. The forward part of the casing 17 has a relatively large opening 20.

The casing 21 for the motor 13 is of similar shape but is reversed relative to the casing 17 so that its rounded surface is forward. The wedge is rotated 90° so that the greatest width is vertical. Moreover, the rounded surface of the casing 21 is somewhat more blunt than the rearward surface of the casing 17. The casing 21 has no holes in its side surfaces but instead has a pair of holes 22 and 23 on its upper and lower surfaces substantially corresponding to the holes 18 and 19 of the casing 17. The casing 21 is provided with a relatively large opening 24 at the rear end thereof. Slots are formed in each wedge and the two are inter-wedged, care being taken to seal all joints so that no air may pass from one casing to the other.

Air moving relative to the engines and their cowling enters the casing 17 through the opening 20 and passes around the motor 11 for cooling that motor. Thereafter, it passes out to the outside atmosphere through the openings 18 and 19. Additional fresh air is drawn into the casing 21 through the openings 22 and 23 and after passing over the motor 13 passes out through the opening 24. Thus, each motor is cooled by fresh air and due to the streamline shape of the casings in which the motors are enclosed, wind resistance is reduced to a minimum.

In Fig. 3 we have shown motors 11$^a$ and 13$^a$, propellers 12$^a$ and 14$^a$ and motor supports 15$^a$ and 16$^a$. The casing 25 is of partially streamline shape and is made in one piece. It is provided with a forward opening 20$^a$ and a rear opening 24$^a$. A partition 26 divides the compartment which encloses the forward motor 11$^a$ from the compartment which encloses the rearward motor 13$^a$. A forward opening 27 at the bottom part of the casing permits the air to enter the casing rearward of the partition 26 and a rearward opening 28 in the upper part of the casing permits air to leave the compartment of the casing forward of the partition 26.

The operation of this form of our invention will be clear from the above description. Fresh air is drawn into the forward part of the casing through the opening 20$^a$, cools the motor 11$^a$ and passes out through the opening 28. Additional fresh and cool air passes in to the rear part of the casing through the opening 27, cools the motor 13$^a$ and passes out through the opening 24$^a$.

It is to be understood that the above described embodiment of the invention is for the purpose of illustration only and various changes may be made therein without departing from the spirit and scope of the invention.

We claim as our invention:

1. In aircraft, a plurality of motors arranged in tandem, a casing for said motors having separate cooling compartments for each motor, and means including said casing for causing air to flow over said motors for the purpose of cooling them.

2. In aircraft, a plurality of motors arranged in tandem, a casing for each said motor, said casings forming separate cooling compartments for each motor, and means including said casings for causing separate streams of air to flow over said motors for the purpose of cooling them, said casings being of substantially streamline shape in at least one plane.

3. In aircraft, a plurality of motors arranged in tandem, a casing for said motors having separate cooling compartments for each motor, and means including said casing for causing air to flow over said motors for the purpose of cooling them, said casing being provided with a plurality of openings for each of said compartments whereby air may flow in through one of the openings and out through another of the openings into, through, and out of each compartment.

4. In aircraft, a plurality of motors arranged in tandem, a casing for each said motor, said casings forming separate cooling compartments for each motor, and means including said casings for causing separate streams of air to flow over said motors for the purpose of cooling them, said casings being provided with a plurality of openings for each of said compartments whereby air may flow in through one of the openings and out through another of the openings into, through and out of each compartment.

5. In aircraft, a plurality of motors arranged in tandem, a casing for said motors, a partition dividing said casing into separate cooling compartments for each of said motors, and means including said casing and partition for causing air to flow over said motors for the purpose of cooling them.

6. In aircraft, a plurality of motors arranged in tandem, means for causing air to flow over one of said motors, and means for causing entirely fresh air to flow over another of said motors.

7. In aircraft, a plurality of motors arranged in tandem, and means for directing an independent stream of air over each of said motors.

8. In aircraft, a plurality of motors arranged in tandem, a casing for said motors, and means including said casing for directing an independent stream of air over each of said motors.

9. In aircraft, a plurality of air-cooled motors arranged in tandem, means for directing a stream of cooling air over the forward motor, and means for directing a fresh stream of cooling air over the rear motor.

10. In aircraft, a casing, a plurality of air-cooled motors arranged in tandem within said casing, means including said casing for directing a stream of air over the forward motor and away from the rear motor after passing over the forward motor, and means including said casing for directing a fresh stream of air over the rear motor.

11. In aircraft, a plurality of air-cooled motors arranged in tandem, a casing for said motors having an air inlet opening at its forward end and an air outlet opening at its rear end, means intermediate the ends of the casing for directing the admitted air after passing over the forward motor outwardly of the casing and away from the rear motor, and means intermediate the ends of the casing for admitting fresh air to the casing and directing said fresh air over the rear motor and outwardly through said outlet opening.

12. In aircraft, a plurality of air-cooled motors arranged in tandem, a casing for said motors having an opening at each end thereof, and having non-communicating inlet and outlet openings intermediate the ends thereof in communication respectively with said end openings.

In testimony whereof we hereunto affix our signatures.

KNUT HENRICHSEN.
GEORGE A. PAGE, Jr.